March 23, 1926.
F. EGLI
PUMP
Filed August 20, 1925
1,577,570
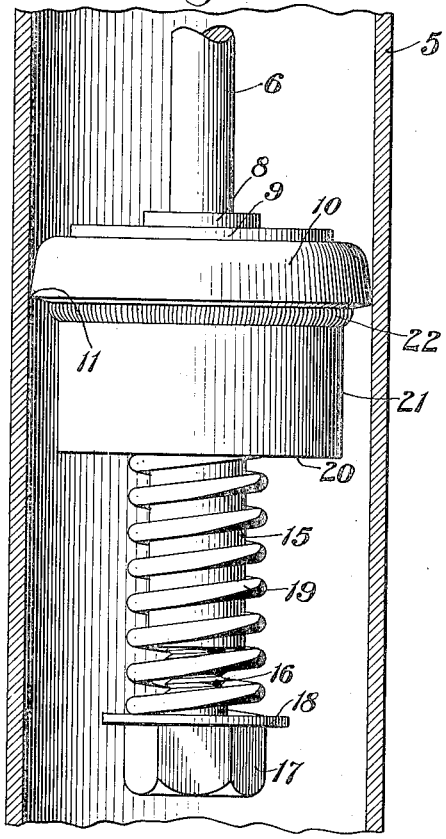
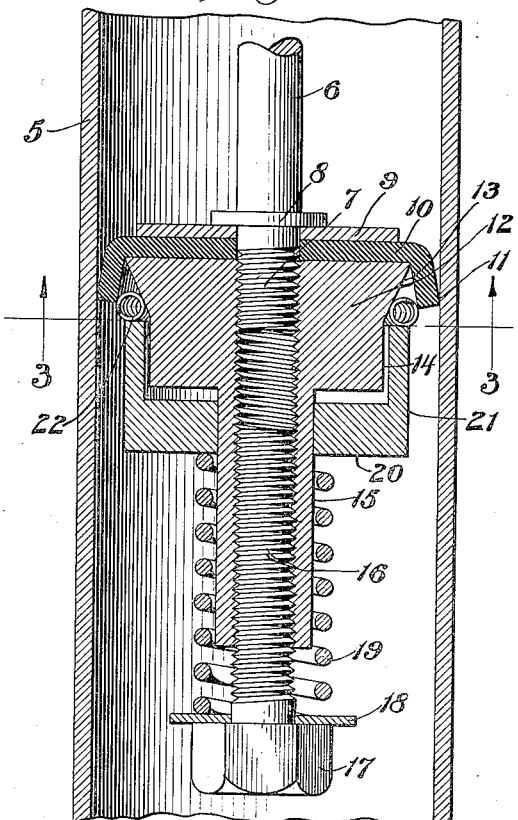
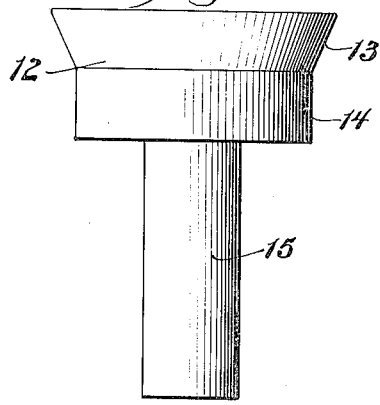
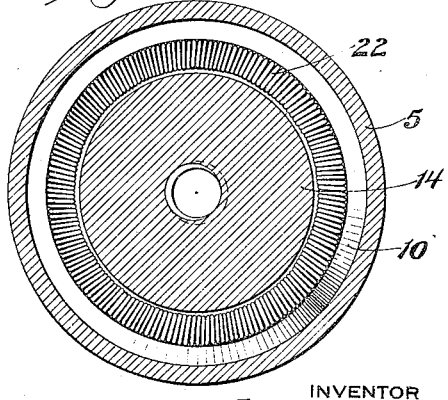
WITNESSES
Chas. L. McDonald
E. N. Lovewell
INVENTOR
Fred Egli
BY
E. G. Siggers
ATTORNEY Patented Mar. 23, 1926.

1,577,570

UNITED STATES PATENT OFFICE.

FRED EGLI, OF ALLIANCE, OHIO.

PUMP.

Application filed August 20, 1925. Serial No. 51,445.

*To all whom it may concern:*

Be it known that I, FRED EGLI, a citizen of the United States, residing at Alliance, in the county of Stark and State of Ohio, have invented a new and useful Pump, of which the following is a specification.

This invention relates to pumps of the reciprocating type, and especially to manually operated air pumps adapted to be used for inflating pneumatic tires and the like.

The object of the invention is to provide a piston head of simple and improved construction, which will operate easily and smoothly within the cylinder, and which will effectively prevent the escape of air past the same on the down stroke. For this purpose a cup of leather, or similar material, is secured to the piston head, and so arranged that its rim is pressed against the wall of the cylinder by spring means, the tension of which may be adjusted.

The detailed construction of the invention and the advantages thereof will be more specifically explained with reference to the accompanying drawings, in which—

Figure 1 is a side elevation of the invention with a portion of the cylinder shown in section.

Figure 2 is a central vertical section.

Figure 3 is a horizontal section taken on the line 3—3 of Figure 2.

Figure 4 is a detail view of the head which is secured to the end of the pump rod.

The invention is shown in connection with a pump cylinder 5, within which a pump rod 6 is adapted to reciprocate. The lower end of the rod 6 is threaded, as at 7, and above the threaded portion is secured a collar 8 against which is seated a washer 9. A cup 10 of leather, or similar material, seats against the washer 9, and its rim 11 is adapted to engage the wall of the cylinder 5. The cup 10 is clamped against the washer 9 by a head 12, which is threaded on to the end portion 7 of the pump rod. The base of the head 12 has a conical surface 13, which tapers downwardly and merges into a cylindrical surface 14. The head also has a downwardly extending stem portion 15, which is internally threaded to receive a screw 16. This screw has a polygonal head 17 against which is seated a washer 18. An expansile coil spring 19 surrounds the stem 15, and acts between the washer 18 and a collar 20, which is slidably mounted on the stem. The collar 20 is formed with a cylindrical flange 21, which fits loosely over the cylindrical portion of the head 12, and engages an endless coil spring 22 which surrounds the conical portion 13 of the head.

The spring 19 normally urges the collar 20 upwardly, and the flange 21 urges the spring 22 upwardly over the conical surface 13, and urges the rim 11 of the leather cup outwardly against the wall of the cylinder. The screw 16 may be adjusted, so as to increase or decrease the pressure of the spring 19. The spring 22 is under tension, and as soon as the pressure of the spring is relieved, the collar drops downwardly, and the spring 22 moves toward the smaller end of the conical surface 13. When the screw 16 is advanced to increase the pressure on the spring 19, the collar 20 and the spring 22 are raised, and the rim 11 of the leather cup is forced against the cylinder wall with greater pressure. In the operation of the pump, after the screw 16 has been properly adjusted, as the pump rod 6 moves downwardly, the rim 11 of the leather cup is held against the wall of the cylinder with sufficient pressure to prevent the escape of air past the same. Upon the return stroke, the rim 11 may move inwardly against the upper surface of the spring 22.

The head 12 and the parts attached thereto may be attached as a unit to the threaded end of any pump rod, merely by removing the nut which is usually used on the same for clamping the leather washer.

While I have shown and described the invention with reference to a hand-operated air pump, it is apparent that the device is capable of use in other relations. It is also apparent that various modifications may be made in the detailed construction and arrangement of the various elements of the invention without departing from the scope of the invention as claimed.

What is claimed is:

1. The combination with a pump rod and a flexible cup adapted to be secured thereto and to engage the wall of the pump cylinder, of means for clamping said cup comprising a head secured to the end of the pump rod and having a conical base portion and a stem portion, a contractile coiled spring encircling said conical base portion, and means supported by said stem and yieldably urging said spring against the inside of the cup rim to cause said rim to bear against the wall of the cylinder.

2. The combination with a pump rod and a flexible cup adapted to be secured thereto and to engage the wall of the pump cylinder, of means for clamping said cup comprising a head secured to the end of the pump rod and having a conical base portion and a stem portion, an endless coil spring stretched about said conical base portion, a collar slidably mounted on said stem portion and having a flange engaging said spring, a head secured to the stem, and an expansile spring acting between the head of the stem and the slidable collar to cause the latter to force the first-mentioned spring against the inside of the cup rim and to expand said rim against the wall of the cylinder.

3. The combination with a pump rod and a flexible cup adapted to be secured thereto and to engage the wall of the pump cylinder, of two clamping members between which said cup is clamped, one of said members comprising a head secured to the pump rod and having a conical base merging into a cylindrical portion with a stem extending from the end of the cylindrical portion, an endless coil spring stretched about said conical base, a collar slidably mounted on said stem and having a flange overhanging the cylindrical portion and engaging said spring, a screw threaded into the end of the stem and having a head of greater diameter than the diameter of the stem, and an expansile coiled spring on the stem acting between the head of the screw and the slidable collar, causing the latter to force the first-mentioned spring against the inside of the cup rim and to expand said rim against the wall of the cylinder, said screw being adjustable to vary the tension of the spring on the stem.

4. The combination with a pump rod, of two clamping members at the end of the rod, a cup clamped between said members, the member which engages the inside of the cup having a conical base portion, an endless elastic member stretched around said conical portion, and yieldable means urging said elastic member toward the larger end of the conical portion and against the inside of the cup rim to expand said rim against the pump cylinder.

5. The combination with a pump rod, of two clamping members at the end of the rod, a cup clamped between said members, the member which engages the inside of the cup having a conical base portion, an endless elastic member stretched around said conical portion, and yieldable means urging said elastic member toward the larger end of the conical portion and against the inside of the cup rim to expand said rim against the pump cylinder, and means for adjusting said yieldable means to vary the pressure exerted against said rim.

In testimony, that I claim the foregoing as my own, I have hereto affixed my signature.

FRED EGLI.